Nov. 25, 1952     D. WILKERSON     2,619,106
AIR LINE AUTOMATIC DRAIN VALVE Original Filed Nov. 15, 1948     6 Sheets-Sheet 1

Fig. 1

INVENTOR
DEWEY WILKERSON

ATTORNEY

Nov. 25, 1952 — D. WILKERSON — 2,619,106
AIR LINE AUTOMATIC DRAIN VALVE
Original Filed Nov. 15, 1948 — 6 Sheets-Sheet 2

Fig. 2.

INVENTOR
DEWEY WILKERSON
BY [signature]
ATTORNEY

Fig. 6.

Nov. 25, 1952 D. WILKERSON 2,619,106
AIR LINE AUTOMATIC DRAIN VALVE
Original Filed Nov. 15, 1948 6 Sheets-Sheet 6

INVENTOR
DEWEY WILKERSON

Patented Nov. 25, 1952

2,619,106

UNITED STATES PATENT OFFICE 2,619,106

AIR LINE AUTOMATIC DRAIN VALVE

Dewey Wilkerson, Denver, Colo., assignor to Wilkerson Corporation, Denver, Colo., a corporation of Colorado Continuation of application Serial No. 60,032, November 15, 1948. This application May 7, 1951, Serial No. 224,992

19 Claims. (Cl. 137—204)

This invention relates to the cleaning of air in compressed air lines for the purpose of removing moisture, dirt, oil, sludge and other foreign matter therefrom; and the present application is a continuation as to all common subject matter of my copending application Serial No. 60,032, filed November 15, 1948.

The present invention is designed for use in air lines and systems wherein compressed air is drawn from a line at intervals, as in the operation of pneumatic tools, air brakes, and various appliances which draw air from a supply line or system at each operation and thus bring about fluctuation of air pressure therein.

An object of the invention is to provide a valve adapted for coupling in a compressed air line and which functions automatically in response to operating pressure variations therein to remove moisture, dirt, oil, and foreign matter from air passed through the valve, and to expel the separated matter to the atmosphere in the vicinity of the valve.

Another object is to provide a valve of the character indicated having means for forcibly expelling the separated matter from the valve by air delivered from the valve at line pressure and without influencing pressure conditions existing within the valve during the expulsion.

A further object is to provide a valve of the character indicated having means enabling the passage of air reversely therethrough upon the occurrence of a back pressure surge. Other objects will be apparent to persons skilled in the art.

In all its forms the valve includes an air expansion chamber, a sump chamber opening therefrom at its bottom and having a discharge port to the atmosphere, and an air discharge chamber above the expansion chamber and separated therefrom by a flexible diaphragm. Compressed air under line pressure enters the expansion chamber and passes to the discharge chamber from which it is withdrawn for the accomplishment of work. In the expansion chamber the air gives up its moisture and entrained foreign matter which settles at the bottom and drains into the sump, from which it is expelled to the atmosphere substantially under line pressure whenever the valve is actuated.

Figure 1:
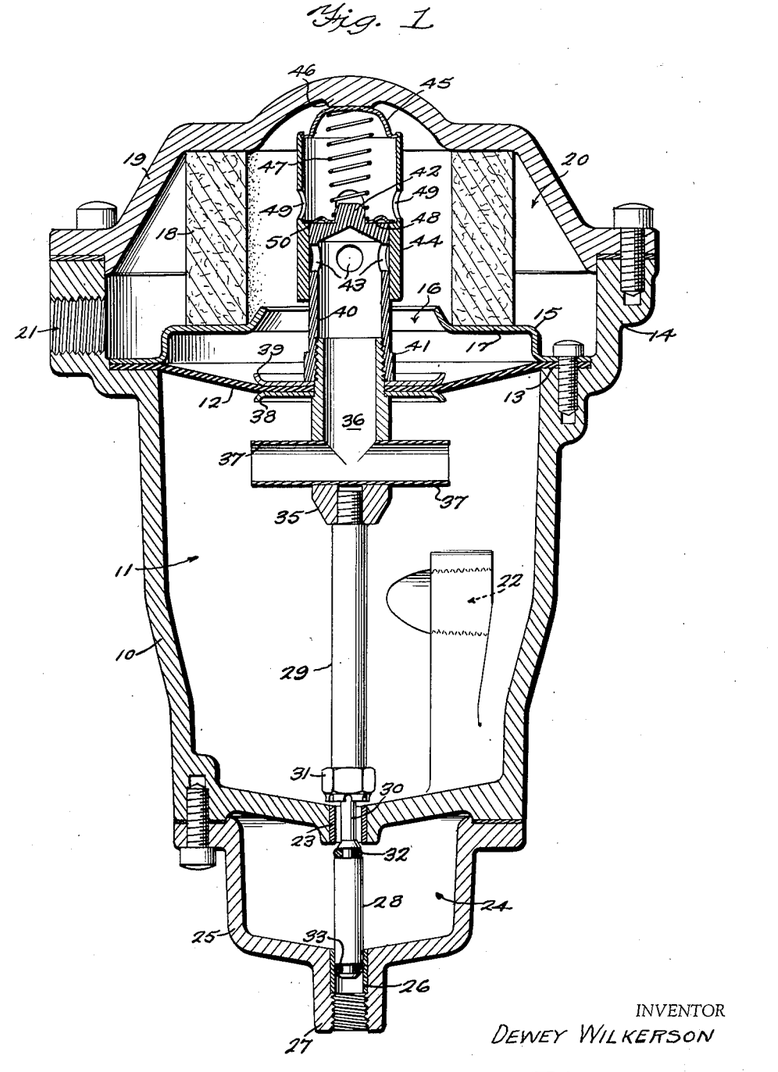
Figure 1 is substantially a central vertical sectional view through a valve embodying the invention, with the valve parts in the positions they assume when the air pressure at opposite sides of the diaphragm is equal.
Figure 2:
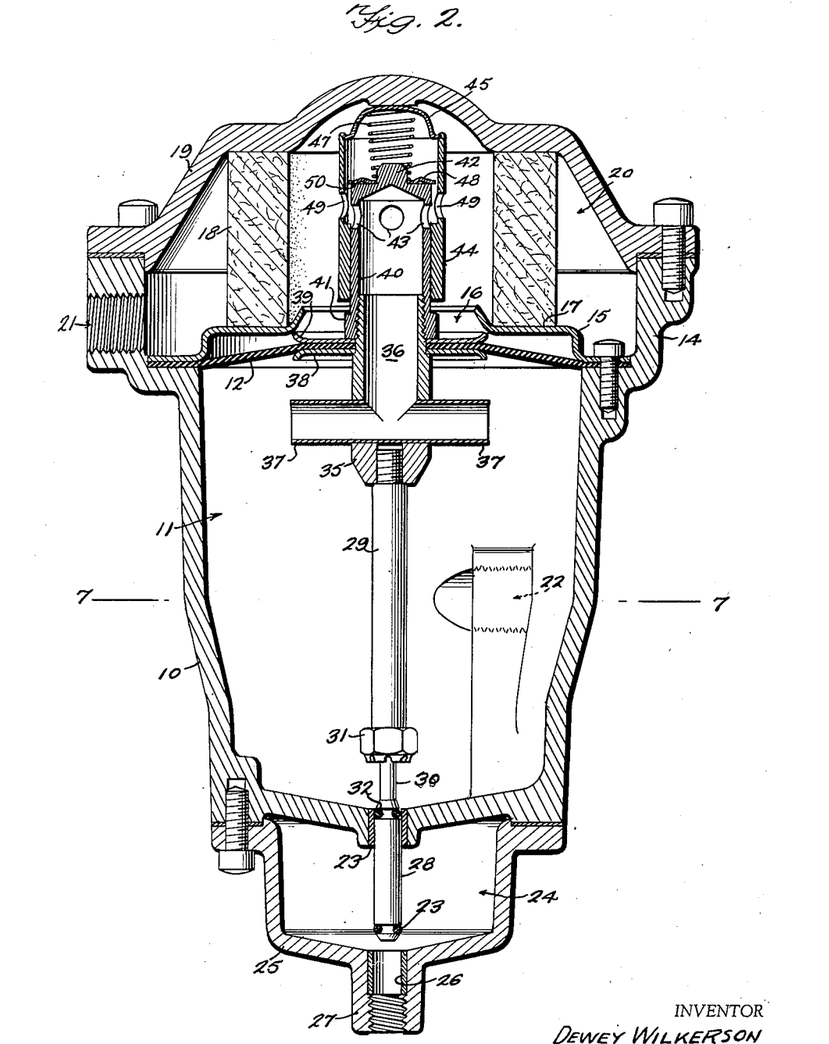
Figure 2 is a view similar to Figure 1 but illustrating the positions assumed by the parts when air is drawn from a line in which the valve is coupled.

The valve illustrated in Figures 1 and 2 comprises a substantially cylindrical valve body 10 having a vertical air expansion chamber 11 closed adjacent its upper end by a flexible diaphragm 12 that is impervious to air and which is marginally clamped between an internal annular shoulder 13 at the base of a belled upper end 14 of the body and the marginal edge portion of a superimposed annular upwardly dished plate 15. The plate 15 is provided with a relatively large central aperture 16, and has a planar portion 17 which serves as a bottom support for an air filter 18. A head 19 is detachably secured to the valve body over its belled upper end 14 in engagement with the top edge of the filter 18, which filter is in the form of a closed ring of relatively large internal diameter.

Above the diaphragm the end 14 of the valve body cooperates with the head 19 to provide an air discharge chamber 20 adapted for open communication with the downstream side of a compressed air line, not shown, through an air outlet port 21 in the end of the valve body. Below the diaphragm the air expansion chamber 11 is adapted for open communication with the upstream side of the air line through a horizontal air inlet port 22 in the wall of the valve body substantially midway between the top and bottom of the air expansion chamber 11. This chamber is dished at its bottom to drain freely through a central aperture provided by a bushing 23 disposed axially through the bottom wall at its lowest point and which opens to the top of a sump chamber 24 in a bottom section 25 that is detachably secured to the lower end exterior of the valve body 10. The sump chamber also is dished at its bottom for drainage through a central aperture provided by a bushing 26 axially aligned with the bushing 23 and preferably of the same internal diameter. The bushing 26 opens through the bore of a nipple 27 to the atmosphere. If desired, the nipple may be connected to a sediment discharge conduit, not shown.

The expansion chamber drainage aperture at the bushing 23 and the sump discharge aperture at the bushing 26 are alternately opened and closed by control valve means 28 located in the sump chamber and carried by the lower end portion of a vertically reciprocable stem 29 for movement therewith. The stem extends axially through the bushing 23 and is connected at its upper end portion to the flexible diaphragm 12. That portion of the stem which passes through the bushing 23 is diametrically reduced, as at 30, to provide adequate drainage clearance between the stem and bushing; and directly above the bottom wall of the expansion chamber 11 stop means 31 is mounted on the stem for abutting engagement with the chamber bottom to limit downward movement of the stem. As here shown, the stop 31 is a castellated nut threaded on the stem for adjustment axially thereon to occupy a position of clearance normally slightly above the bottom wall of the expansion chamber when air pressure conditions at both sides of the diaphragm are equal. The control valve means 28, in the form here disclosed, comprises a double acting cylindrical plug of a diameter sufficient to effect a snug but free sliding fit in the bushings 23 and 26 and of sufficient axial extent to dispose an appreciable portion of either end in the adjacent bushing when the valve is at the limit of its closed position at that point. The upper end portion of the plug which controls the bushing 23 mounts a packing and sealing ring 32 of rubber or other suitable material, and a similar ring 33 is mounted on the lower end portion of the plug to control the bushing 26. The axial extent or length of the plug is such that, when the stem 29 is actuated by flexion of the diaphragm, the ring 32 enters the bushing 23 before the ring 33 leaves the bushing 26, and vice versa. In effect, the rings constitute a pair of oppositely acting and simultaneously operating valves, one of which is always closed while the other is open, and both of which are simultaneously closed for an interval of time before either is opened. Both cannot be open at the same time. This is an important feature of the invention; it prevents any possibility of failure in the event of a pressure differential in the chambers 11 and 20 insufficient to cause full stroke movement of the stem 29.

Figures 5, 8:
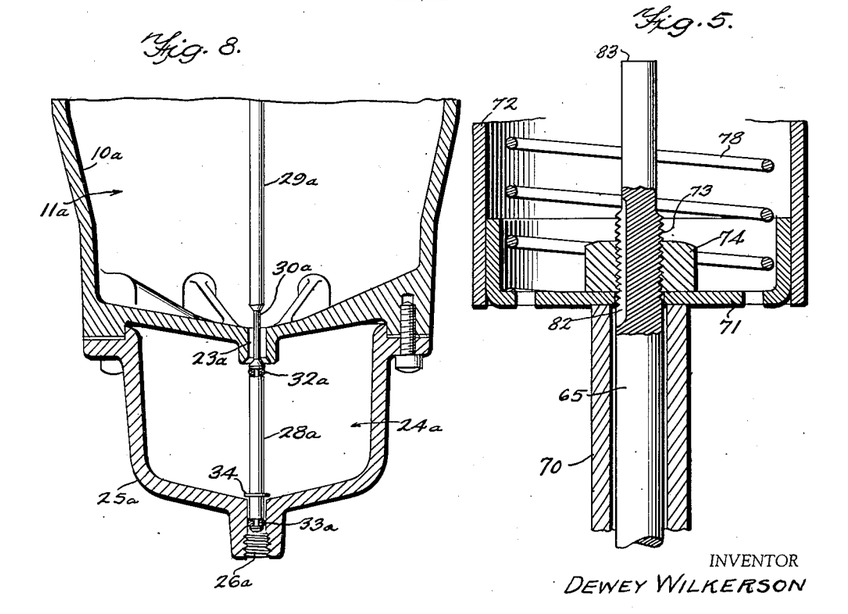
Figure 5 is an enlarged fragmentary sectional view illustrating a detail of the modified form of valve.
Figure 8 is substantially a fragmentary central vertical section through the lower end portion of the valve body illustrating an alternative drain control structure.

In an alternative embodiment of the drain control assembly, as shown in Fig. 8, the valve plug 28a and stem 29a are of substantially equal diameter and the diametrically reduced portion 30a of the stem plays in and through a central drain aperture 23a in the dished bottom wall of the air expansion chamber 11a. Like the form shown in Fig. 1, the double acting plug 28a is disposed within the sump chamber 24a and comprises a cylinder of sufficient diameter to effect a snug but free sliding fit in the bore of the drain aperture 23a and the sump discharge aperture 26a. The plug is of sufficient axial extent to dispose an appreciable portion of either end in the adjacent aperture when the valve is at the limit of closure at that point. The plug 28a mounts a rubber packing and sealing ring 32a at its upper end and a similar ring 33a at its lower end which, in location, function, and operation are identical with the rings 32 and 33 of the Fig. 1 form. In this structural embodiment, however, the extent of downward movement of the valve stem and plug is determined by contact of an abutment 34 on the plug against the bottom wall of the sump 25a.

Reverting to Figs. 1 and 2, the stem 29 mounts at its upper end a cylindrical fitting 35 which extends axially upward a short distance through and above the diaphragm 12. This fitting has an axial bore 36 of relatively large diameter open at its upper end and in communication at its lower end with the intersecting bores of a plurality of horizontal spur tubes 37 that project radially from the fitting 35 slightly below the diaphragm. That portion of the fitting which extends through the diaphragm is formed with an external shoulder which seats a pair of center plates 38 and 39 with the diaphragm between them. The upper end portion of the tubular fitting above the diaphragm has threaded connection with the lower end of an axially bored nozzle 40 which is externally shaped as a nut 41 at said lower end whereby the center support plates and the diaphragm are clamped together and against the shoulder on the fitting 35 in a fixed leakproof connection therewith. The nozzle 40 is cylindrical and has a closed upper end provided with an external axial boss 42, and the wall of the nozzle adjacent the closed end is formed with a plurality of radial air ports 43 leading from the nozzle bore.

The ported upper end portion of the nozzle is reciprocable axially as a piston within a cylinder 44 closed at its upper end by a convex cap 45 which bears against a complemental internal boss 46 on the valve body head 19. An expansion spring 47 within the cylinder bears at its upper end against the cap and at its lower end against a washer 48 seated on the upper end of the nozzle around its boss 42, and provides a biasing means urging the valve stem assembly downward to assume its Fig. 1 position under conditions of equal air pressure at opposite sides of the diaphragm. The wall of the cylinder is provided with radial air ports 49 corresponding to the piston nozzle ports 43 and adapted for substantial registry therewith when the nozzle is moved upwardly against the bias of the spring 47 to the proper height within the cylinder. The upper half portion of the cylinder 44 which carries the air ports 49 is of larger internal diameter than the lower half which encompasses the upper end of the piston nozzle and which contains the air ports 43. This difference in diameter establishes within the cylinder an internal annular shoulder 50 that provides a seat for the peripheral edge portion of the washer 48 and thus serves as a stop means limiting the normal downward travel of the piston nozzle in the cylinder under propulsion by the spring 47. At this limit of travel the nut 31 on the stem 29 comes to rest at its indicated clearance above the bottom wall of the air expansion chamber. Also at this position the air ports 43 are closed by the cylinder wall except for a highly restricted bleeder passage between the cylinder wall and the piston nozzle resulting from an intentional slightly loose sliding fit between these parts.

Enough air is thus enabled to pass from the chamber 11 to the chamber 20 to compensate for possible slow leakage downstream in a line in which the valve is coupled.

In service, the valve is coupled in a compressed air line with the inlet 22 in communication with the upstream side and the outlet 21 in communication with the downstream side. Between periods of actuation the air pressure in the chambers 11 and 20 at opposite sides of the diaphragm is equal and the parts assume their positions as shown in Figure 1 under the biasing force of the spring 47. At this stage the drain aperture to the sump is open but the sump discharge port is closed, so that air in the sump chamber is at line pressure. When air is drawn from the downstream side of the line, as in the operation of air brakes, pneumatic tools and the like, the pressure in discharge chamber 20 immediately drops as no air can pass into this chamber except a drastically reduced flow through the restricted bleeder passage between the piston nozzle 40 and the encompassing wall of the cylinder 44 below the ports 43. The resultant pressure differential between the air discharge chamber 20 and the air intake chamber 11 causes the diaphragm 12 to flex upwardly into the discharge chamber beneath the filter support plate 15. This movement of the diaphragm lifts the entire valve stem assembly and forces the piston nozzle 40 up within the cylinder 44 against the bias of the spring 47 to bring the ports 43 into registry with the ports 49 as shown in Fig. 2. Air under full line pressure then passes freely from the chamber 11 through the spur tubes 37, stem bore 36, nozzle 40 and the ports 43—49 into the discharge chamber 20, through the filter 18 and outlet 21.

As the stem 29 begins its upward travel the plug 28 in the sump chamber first closes the drain aperture through the bushing 23 and then opens the sump discharge port through the bushing 26, whereupon any sediment collected in the sump chamber is expelled by the air trapped therein at line pressure. At the same time, and for as long as air is being withdrawn from the discharge chamber, incoming air blasts into the expansion chamber 11 with a cyclonic action from the tangential inlet 22. Due to this action and to rapid expansion all moisture and entrained foreign matter separates from the air and collects on the bottom of the chamber. Any oil vapor in the air is taken up by the filter 18, which preferably is constituted of wrapped cotton. Air issuing from the discharge port 21 is thus completely cleansed of dirt, oil vapor and moisture. The spur tubes 37 take the air from the top of the expansion chamber where it is purest, and as the mouths of these tubes are spaced from the stem 29 it is impossible for air entering the tubes to pick up moisture carried up the stem by capillary action.

As soon as discharge of air from the outlet 21 is stopped pressure builds up in the chamber 20 and equalizes with pressure in the chamber 11, whereupon the spring 47 assisted by the weight of the stem assembly acts to return the parts to their original position with the diaphragm flexed downwardly, the ports 43 out of registry with the ports 49 and substantially closed by the wall of cylinder 44, and the valve plug 28 fully closing the sump discharge port and with the expansion chamber drain aperture open to the sump. During the periods between actuations of the valve the accumulation of moisture, sludge, and foreign matter on the bottom of the expansion chamber drains freely into the sump. At each actuation of the valve in the manner described all matter collected in the sump is forcibly expelled to the atmosphere without influence on the air pressure in the expansion chamber at the time.

In the embodiment of the invention illustrated in Figs. 3–6, the valve comprises a substantially cylindrical body 51 having a vertical air expansion chamber 52 closed at its upper end by a flexible diaphragm 53 that is impervious to air and which is marginally clamped between the upper end of the body and a head 54 detachably secured to the upper end of the body by appropriate fastening elements 55. Above the diaphragm the head 54 is formed with an air discharge chamber 56 in communication through an appropriate aperture in the diaphragm with an outlet passage 57 in a radial boss on the upper end portion of the valve body. The outlet passage is adapted for open communication with the downstream side of a compressed air line, not shown. Below the diaphragm the air expansion chamber 52 also is adapted for open communication with the upstream side of the same air line through a horizontal air inlet passage 58 in another radial boss located adjacent the upper end of the valve body. This chamber is dished at its bottom for free drainage through a central aperture 59 in the bottom wall at its lowest point and which opens to the top of a sump chamber 60 in a bottom section 61 that is detachably secured to the lower end of the valve body. The sump chamber also is dished at its bottom for drainage through a discharge aperture 62 which opens through the bore of a nipple 63 to the atmosphere. If desired, the nipple may be connected to a sediment discharge conduit, not shown.

Figure 3:
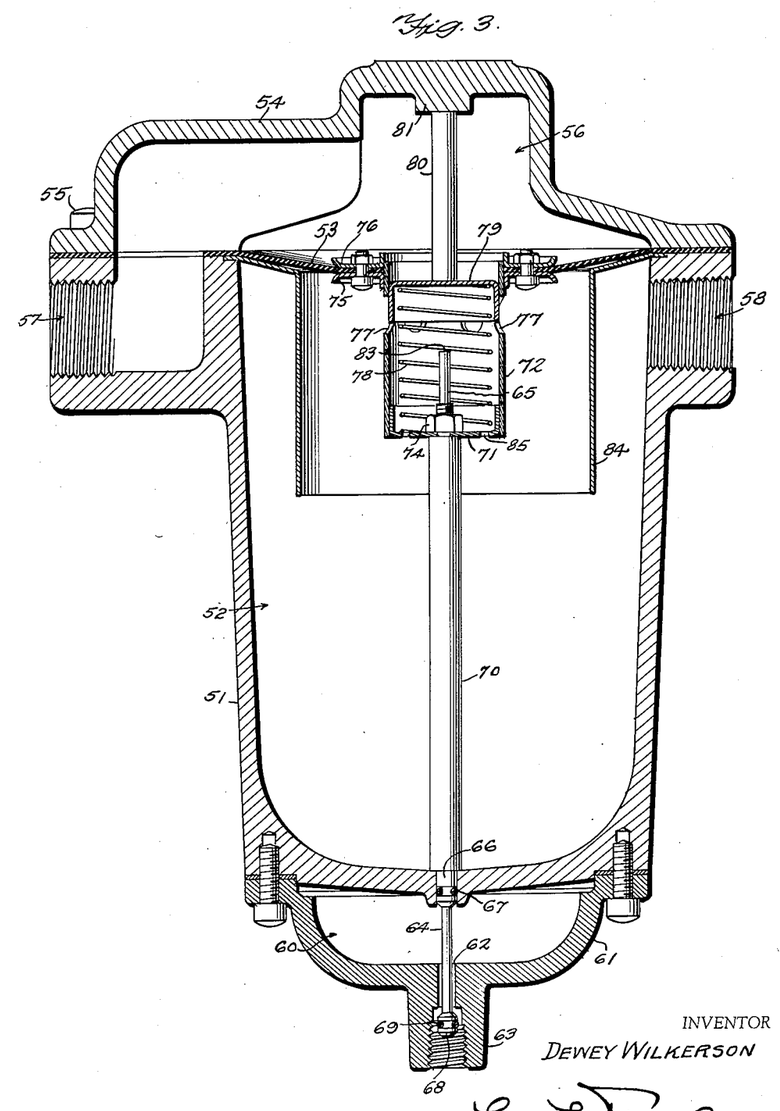
Figure 3 is substantially a central vertical sectional view through a valve embodying a modified form of the invention, with the valve parts in the positions they assume when the air pressure at opposite sides of the diaphragm is equal.

The expansion chamber drain aperture 59 and the sump discharge aperture 62 are alternately opened and closed by control valve means carried by the lower end portion 64 of a vertically reciprocable stem 65 for movement therewith. The portion 64 reciprocates axially within the sump chamber through the apertures 59 and 62 and is reduced in diameter to provide drainage clearance relative thereto. At the upper end of the portion 64 the stem is enlarged in diameter to provide a valve plug 66 that has a snug sliding fit in the expansion chamber drain aperture 59 and which mounts a sealing and packing ring 67 of rubber or other suitable material, and at its lower end the stem portion 64 is similarly enlarged in diameter to provide a valve plug 68 that has a snug sliding fit in the sump chamber discharge aperture 62 and which mounts a sealing and packing ring 69 similar to the ring 67. The axial extent of the reduced stem portion 64 is such that the two axially spaced valves constituted by the plugs 66 and 68 act simultaneously and oppositely, so that one is always closed while the other is open. Both valves are closed simultaneously for an interval of time before either is opened, and both cannot be open at the same time.

The stem 65 for the major portion of its length within the air expansion chamber 51 is encased in a loose fitting sleeve 70 greater in external diameter than the diameter of the chamber drain aperture 59, so that the lower end of the sleeve abuts the bottom wall of the chamber to provide a stop means limiting downward travel of the stem assembly to the position shown in Fig. 3, with the drain aperture control valve 66 fully closed and the sump discharge aperture control valve 68 fully open. The upper end of the sleeve abuts the under face of a cupped member 71 of annular form that is welded or otherwise rigidly attached in the lower end of a vertical cylinder 72 to constitute the bottom thereof. This cylinder is concentric with respect to the stem 65 which, at its upper end, has a threaded portion 73 passed through the member 71 in engagement with a nut 74 whereby the cylinder assembly is held against the upper end of the sleeve 70 in a fixed connection with the sleeve and valve stem. The lower end portion of the sleeve seats on a shoulder formed by the top of the stem-carried valve plug 66 and is thus held between the shoulder and the cylinder bottom member 71 for movement with the stem. The upper end of the cylinder is passed through the diaphragm 53 in fixed attachment thereto and is open into the air discharge chamber above the diaphragm. Attachment between the diaphragm and cylinder is effected by means of a pair of center plates 75 and 76 holding the diaphragm clamped between them. These plates are centrally apertured on the external diameter of the cylinder, and the lower plate is formed with a depending annular flange welded or otherwise fixedly secured to the cylinder at its upper end. Immediately subjacent this flange of the lower plate 75 the wall of the cylinder is formed with an annular series of air ports 77.

The closed bottom end 71 of the cylinder seats one end of an expansion spring 78 that bears at its other end against the top of a depending skirt piston 79 disposed within the cylinder. This spring biases the piston and cylinder to relative axial movement in opposite directions. The biased movement of the cylinder 72 is downward to the limit permitted by engagement of the lower end of the stem sleeve 70 against the bottom of the chamber 51, and the biased movement of the piston 79 is upward to the extent permitted by engagement of an upstanding axial post 80 carried by the piston against a boss 81 on the head 54. Under conditions of equal air pressure in the chambers 52 and 56 at opposite sides of the diaphragm, the parts assume the positions shown in Fig. 3, with the piston skirt substantially closing the cylinder air ports 77 and blocking communication between the two chambers except for a highly restricted air bleeder passage between the cylinder wall and the skirt of the piston resulting from a slightly loose sliding fit between these parts. Enough air is enabled to pass through the bleeder passage from the chamber 52 to the chamber 56 to compensate for possible slow leakage downstream in a line in which the valve is coupled.

As shown in Fig. 5, the threaded portion 73 of the valve stem 65 is provided with an axial surface groove or channel 82 which opens at its upper end above the nut 74 and at its lower end beneath the cylinder bottom 71 into the space between the stem and the loose sleeve 70. This provides free air passage between the parts and allows moisture to drain from the sleeve bottom. The upper end portion of the stem extends axially within the cylinder with its terminal 83 disposed appreciably below the zone of the air ports 77 and provides a stop for contact with the piston to limit the extent of relative telescoping movement between the cylinder and piston. The entire cylinder assembly is surrounded by an annular air baffle 84 mounted on the upper end of the valve body and depending therefrom beneath the diaphragm.

In service, the valve is coupled in a compressed air line with the inlet 58 in communication with the upstream side and the outlet 57 in communication with the downstream side. Between periods of actuation the air pressure in the chambers 52 and 56 at opposite sides of the diaphragm is equal and the parts assume their positions as shown in Fig. 3 under the biasing force of the spring 78. At this stage, in this embodiment of the invention, the drain aperture from the air expansion chamber 52 to the sump is closed and the discharge aperture from the sump is open. When air is drawn from the downstream side of the line the pressure in the discharge chamber drops at once as no air can pass into this chamber except a trickle through the bleeder passage beetween the upper end of cylinder 72 and the piston 79. The resultant pressure differential in the two chambers causes the diaphragm to flex upwardly into the discharge chamber and to lift the entire valve stem assembly and the cylinder 72 against the tension of the spring 78. The piston remains stationary due to abutment of its post 80 against the boss 81, so that the cylinder rises above the top of the piston and fully opens the air ports 77, to the position shown in Fig. 4. Air under full line pressure then passes freely from the chamber 52 to the discharge chamber 56 and outlet 57.

Figure 4:
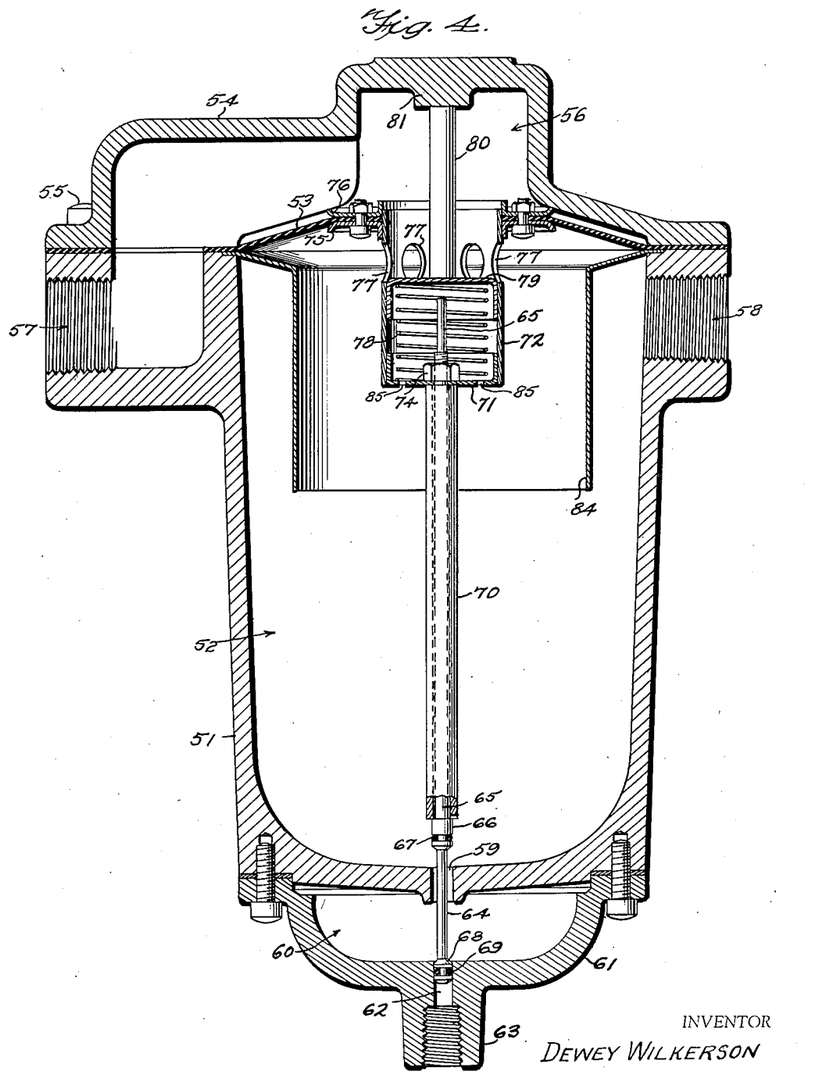
Figure 4 is a view similar to Figure 3 but illustrating the positions assumed by the parts when air is drawn from a line in which the valve is coupled.

As the stem assembly begins its upward movement the sump discharge passage 62 is first closed by the valve 68 and then the valve 66 opens the drain aperture 59. Air from the inlet 58 blasts against the baffle 84 for as long as air is drawn from the outlet 57, and the entrained dirt and moisture separates out and falls to the bottom of the expansion chamber where it drains freely into the sump. When the passage of air through the valve is stopped, pressure immediately becomes the same on both sides of the diaphragm, whereupon the spring 78 acts to move the cylinder 72 downwardly and with it the diaphragm and the valve stem assembly. The parts thus are returned to their original positions with the valve 66 closing before the valve 68 opens. When the valve 68 opens, the air trapped in the sump chamber at line pressure forcibly expels the accumulated sludge to the atmosphere.

Figure 6:
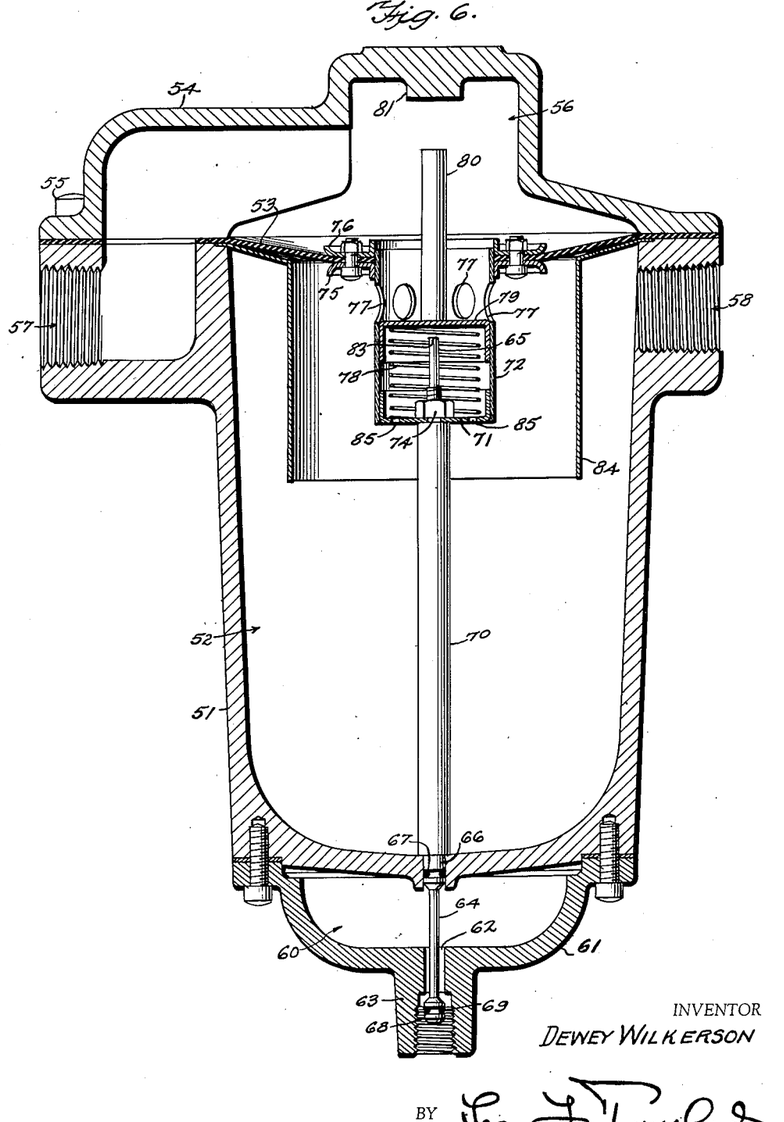
Figure 6 is a view similar to Figure 3 but illustrating the positions assumed by the parts when a back pressure occurs in the air line.
Figure 7:
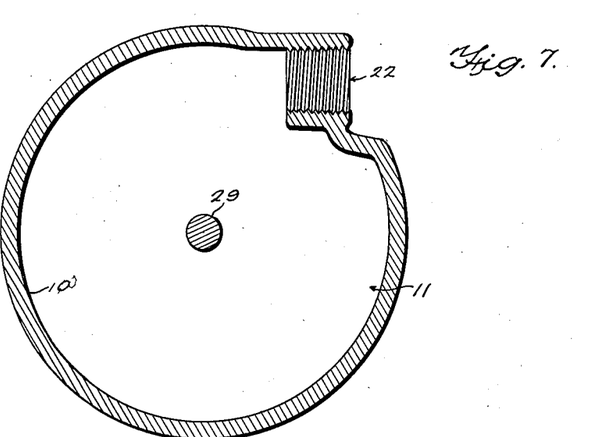
Figure 7 is a sectional view on line 7—7 of Figure 2.

In the event of a sudden, heavy backward flow of air (which is necessary on some operations) the valve is automatically reversible to allow the back surge to pass through the valve without damage. In such case, as shown in Fig. 6, the heavy pressure in the discharge chamber 56 acting on the top of the piston 79 forces it downwardly in the cylinder 72 past the ports 77, which are fully opened to permit free back flow of air through the expansion chamber 52 and inlet 58 to the upstream side of the line. The piston movement is cushioned by the spring 78 and the air escapes from beneath the piston through bleed holes 85 in the cylinder bottom 71 and through the stem groove 82 and sleeve 70. The stem terminal 83 provides a stop preventing downward travel of the piston sufficient to impose rupturing strain on the cylinder and diaphragm. Although in this form of the invention the opening and closing of the expansion chamber drain valve and the sump discharge valve is reversed relative to the comparable valves in the form illustrated in Figs. 1 and 2, either cycle of movement is optional for either embodiment of the invention. The essential feature is the relative overtravel of the two valves whereby the air expansion chamber is never open to the atmosphere.

From the foregoing detailed description it is apparent that in its broad aspects the valve body may be any suitable housing having an air inlet, an air outlet, at least one water outlet for the removal of moisture, dirt, oil and foreign matter, and a flexible diaphragm dividing the housing into at least two chambers of which one communicates with the air inlet and the other with the air outlet. An air passage is provided through the diaphragm of sufficient capacity to allow full air flow from inlet to outlet. A pressure differential operated valve is connected with the diaphragm for operation by its flexion to control the water outlet. Restrictor means normally chokes the air passage when the air pressure is the same on both sides of the diaphragm and allows only enough air to pass to take care of leakage. When a pressure differential exists at opposite sides of the diaphragm the restrictor means is rendered ineffective, so that substantially unrestricted air flow is obtained through the air passage.

It is to be understood that the present disclosure is illustrative of various embodiments of the invention but is not restricted thereto. Any desired changes and modifications consistent with the scope of the invention as claimed may be made in the details of the structure as shown.

I claim:

1. A compressed air line drain valve comprising a housing having therein an air inlet, an air outlet, a pair of water outlets spaced apart in series, and a flexible diaphragm dividing the housing into two chambers one of which communicates with the air outlet and the other of which communicates with the air inlet and with both of the water outlets one through the other, said diaphragm having an air passage therethrough; a valve stem assembly in the housing having thereon valve means controlling both water outlets oppositely and in series; a fixed valve element in the housing, a valve member cooperating with said fixed valve element and movable with and by the diaphragm in one direction to restrict its air passage and in the opposite direction to open the air passage fully; and an operating connection between the diaphragm and the stem assembly for moving the latter in directional response to flexion of the diaphragm to close one water outlet and then open the other, said diaphragm flexing in one direction upon a pressure differential in said two chambers and in the opposite direction upon equalization of pressure therein.

2. A compressed air line drain valve comprising a housing having therein an air inlet, an air outlet, a water outlet, and a flexible diaphragm dividing the interior into two chambers one of which communicates with the air outlet and the other of which communicates with both the air inlet and the water outlet, said diaphragm having an air passage therethrough; a pressure differential operated valve secured to the diaphragm and adapted upon flexion of the diaphragm in one direction to open the water outlet and upon flexion of the diaphragm in the opposite direction to close the water outlet; and means normally restricting air flow through the air passage in the diaphragm under conditions of equal air pressure on opposite sides of the diaphragm, said restricting means being movable with and by the diaphragm rotative to a fixed valve element in the housing to relieve restriction of air flow through the diaphragm passage upon the occurrence of a pressure differential in said two chambers sufficient to cause flexion of the diaphragm.

3. A compressed air line drain valve comprising a housing having therein an air inlet, an air outlet, a water outlet, and a flexible diaphragm dividing the housing into two chambers one of which communicates with the air outlet and the other of which communicates with both the air inlet and the water outlet; a sump on the housing in communication with said water outlet and also having a water outlet; a valve stem in the housing having one end portion provided with valve means controlling both said water outlets in series; said diaphragm having an air passage therethrough; a fixed valve element in the housing, a valve member cooperating with said fixed valve element and movable with the diaphragm in one direction to restrict its air passage and in the opposite direction to open said passage fully; and an operating connection between the diaphragm and the stem for movement of the latter by flexion of the diaphragm in response to pressure differential in said two chambers whereby to close one of said water outlets and open the other by operation of said water outlet control valve means.

4. A compressed air line drain valve comprising a body having therein an air expansion chamber, an air discharge chamber, and a flexible diaphragm between the two; said expansion chamber having an air inlet and also a drain aperture, and said discharge chamber having an air outlet; said diaphragm having an air passage therethrough establishing communication between said chambers; a fixed valve element in the housing, means cooperating with said fixed valve element and movable with and by the diaphragm and biased to a position normally restricting the diaphragm air passage when air pressure on opposite sides of the diaphragm is equal; said diaphragm flexing into the discharge chamber upon a reduction of line pressure therein whereby to shift said restrictor means and remove its restriction relative to the diaphragm air passage; valve means controlling said drain aperture; and an operating connection between said restrictor means and the valve means.

5. A compressed air line drain valve comprising a housing having therein an air inlet, an air outlet, a water outlet, and a flexible diaphragm dividing the housing into two chambers one of which communicates with the air outlet and the other of which communicates with the air inlet; a pressure differential operated valve in said housing secured to and extending through said diaphragm capable of closing said water outlet at times; an air passage in said pressure differential operated valve having one end communicating with said air inlet and its other end communicating with said air outlet; and valve means at one end of said air passage normally restricting the same only in the absence of a pressure differential in said chambers sufficient to operate the valve.

6. A compressed air line drain valve comprising a housing having therein an air inlet, an air outlet, a water outlet, and a flexible diaphragm dividing the housing into two chambers one of which communicates with the air outlet and the other of which communicates with the air inlet; a pressure differential operated valve in said housing secured to and extending through said diaphragm capable of closing said water outlet at times; an air passage in said pressure differential operated valve having one end communicating with the air inlet and the other end communicating with the air outlet; and means normally restricting said air passage, said means being rendered ineffective by the diaphragm while under the influence of a pressure differential sufficient to operate the valve.

7. A compressed air line drain valve comprising a housing having therein an air inlet, an air outlet, a water outlet, and a flexible diaphragm dividing the housing into two chambers one of which communicates with the air outlet and the other of which communicates with the air inlet; a pressure differential operated valve in said housing secured to and extending through said diaphragm capable of closing said water outlet at times; an air passage in said pressure differential operated valve having one end communicating with the air inlet and the other end communicating with the air outlet through a nozzle on the pressure differential operated valve; means in the housing substantially closing off air flow through said nozzle when pressure on opposite sides of the diaphragm is equal; and said diaphragm flexing to move the nozzle relative to said closing off means to effect full opening of the nozzle upon the occurrence of a pressure differential on opposite sides of the diaphragm sufficient to operate the valve.

8. A compressed air line drain valve comprising a housing having therein an air inlet, an air outlet, a water outlet, and a flexible diaphragm dividing the housing into two chambers one of which communicates with the air outlet and the other of which communicates with the air inlet; a valve stem assembly secured to and extending through said diaphragm and having an air passage therein; a piston nozzle on the stem at one side of the diaphragm in communciation with said air passage and having ports, and the passage being open to the housing interior at the other side of the diaphragm; a cylinder in the housing receiving the piston nozzle and having ports for registry with the nozzle ports upon flexion of the diaphragm due to a pressure differential at opposite sides thereof; means biasing said diaphragm to an opposite position of flexion under conditions of equal pressure at opposite sides thereof whereby to dispose the nozzle ports out of registry with the cylinder ports for substantial closing of the air passage; and a valve on said stem assembly controlling said water outlet in accordance with directional movement of the diaphragm.

9. A compressed air line drain valve comprising a housing having therein an air expansion chamber provided with an air inlet and with a water outlet, an air discharge chamber provided with an air outlet, a flexible diaphragm separating the two chambers, a stem fixedly secured adjacent one end to the diaphragm and extending therethrough, a valve on the other end of the stem capable of closing said water outlet at times, said stem having an air passage therein establishing communication between the chambers at opposite sides of the diaphragm, means on the valve stem preventing escape of air from the expansion chamber through said water outlet while said stem valve is open, a piston nozzle on the end of said stem in the air discharge chamber in communication with the stem air passage, a cylinder in said discharge chamber over said nozzle and normally substantially closing its ports under a condition of equal air pressure in the two chambers, said cylinder having ports for registry with the nozzle ports, means biasing said diaphragm and nozzle to a normal position of non-registry of the nozzle and cylinder ports, said diaphragm flexing into the discharge chamber upon a reduction of air pressure therein whereby to move said nozzle in the cylinder to register the ports in both, and said diaphragm and nozzle returning to said normal position when the pressure in the two chambers equalizes.

10. A compressed air line drain valve comprising a housing having therein an air expansion chamber provided with an air inlet and with a water outlet, an air discharge chamber provided with an air outlet, a flexible diaphragm separating the two chambers, a stem fixedly secured adjacent one end of the diaphragm and extending therethrough, a valve on the stem capable of closing said water outlet at times, an air passage in the stem open at one end into said expansion chamber and through a valve element on the end of the stem into said discharge chamber, a valve element in the discharge chamber cooperating with said valve element on the end of the stem normally to restrict the stem air passage when the pressure in said chambers is equal, said valve elements having relative movement into and out of restrictive position, means biasing said valve elements into restrictive position with the diaphragm flexed in the direction of said expansion chamber, and said diaphragm flexing in the opposite direction upon the occurence of a pressure differential between the chambers to move the stem for actuation of the water outlet valve and to remove said cooperating valve elements from restrictive position.

11. A compressed air line drain valve comprising a housing having therein an air inlet, an air outlet, a water outlet, and a flexible diaphragm dividing the housing into two chambers one of which communicates with the air outlet and the other of which communicates with the air inlet, said diaphragm having an air passage therethrough; a pressure differential operated valve controlling the water outlet and having a stem; a cylinder at one side of the diaphragm in fixed connection therewith and with said stem and having air ports through its wall, the cylinder being open at one end into the diaphragm air passage; a piston reciprocable in the cylinder; spring means in the cylinder biasing both the cylinder and the piston to move apart; stop means limiting separating movement of the cylinder and piston to a position in which the cylinder air ports are substantially closed by the piston; said diaphragm flexing under a pressure differential at opposite sides thereof to move in the direction of the lower pressure and telescoping the cylinder upon the piston when the air inlet pressure is the greater, said piston telescoping into the cylinder upon a back pressure through the air outlet greater than the air inlet pressure; and either telescoping action being effective to open said cylinder air ports for free air flow from one side of the diaphragm to the other.

12. A compressed air line drain valve comprising a housing having therein an air expansion chamber provided with an air inlet and with a water outlet, an air discharge chamber provided with an air outlet, a flexible diaphragm separating the two chambers, a pressure differential operated valve controlling the water outlet and having a stem in the expansion chamber, said diaphragm having an air passage therethrough, a cylinder in the expansion chamber in fixed connection with said stem and diaphragm and open at one end into the diaphragm air passage, said cylinder having air ports establishing communication between the cylinder bore and the expansion chamber, a piston in the cylinder and dimensioned for substantial closure of said air ports in one position, means biasing the cylinder and piston to move apart and effective to maintain said air ports substantially closed by the piston while pressure in the two chambers is equal, and said diaphragm flexing into the discharge chamber upon a service reduction of pressure therein to telescope the cylinder and piston sufficiently to carry the cylinder air ports past the piston for full air flow from the expansion chamber into the discharge chamber.

13. A compressed air line drain valve comprising a housing having therein an air expansion chamber provided with an air inlet and with a water outlet, an air discharge chamber provided with an air outlet, a flexible diaphragm separating the chambers and having an air passage therethrough, a pressure differential operated valve controlling the water outlet and having a stem in the expansion chamber, a cylinder in the expansion chamber in fixed connection with said stem and diaphragm and open at one end to the diaphragm air passage, said cylinder having air ports through its wall, a piston reciprocable in the cylinder, a spring in the cylinder biasing both the cylinder and piston to move apart, a stop member on the piston for contacting the housing through the open end of the cylinder to limit separating movement of the piston relative to the cylinder, said piston at the limit of its separating movement substantially closing the cylinder air ports, said diaphragm flexing into the discharge chamber upon a service reduction of pressure therein to carry the cylinder air ports past the piston for free air flow between said chambers and returning to air port closed position upon equalization of pressure therein, and said piston telescoping into the cylinder to open its air ports upon a back pressure in the discharge chamber sufficient to overcome the bias of said spring.

14. A compressed air line drain valve comprising a housing divided into two chambers by a flexible diaphragm, one chamber having an air inlet and the other having an air outlet, a water outlet in the housing, means providing a full capacity air passage between the chambers past the diaphragm, means normally restricting said passage to a limited capacity bleeder substantially closing the passage in the absence of a pressure differential between the chambers, said restricting means being rendered ineffective by the diaphragm flexing in response to a pressure differential between the chambers, and a pressure differential operated valve connected with the diaphragm and controlling the water outlet.

15. A compressed air line drain valve comprising a housing having an air inlet chamber and an air discharge chamber separated by a flexible diaphragm movable in response to a pressure differential between the chambers, a sump communicating through a water outlet with the air discharge chamber and itself having a water outlet, a stem assembly secured to the diaphragm for movement therewith in two directions and having a portion passed through one water outlet for extension into the other, separate valve means on said portion controlling the water outlets oppositely in series, and said separate valve means having relative overtravel such that both water outlets are closed for an interval before either is opened.

16. In a compressed air line drain valve including a housing having an air inlet chamber, an air discharge chamber, a flexible diaphragm separating the two and movable in response to a pressure differential therein, a water outlet in the inlet chamber, and a pressure differential operated valve in the inlet chamber in operating connection with the diaphragm and controlling the water outlet; means providing an air passage between said chambers past the diaphragm and including a pair of relatively slidable members one of which has fixed connection with the diaphragm for movement therewith in two directions, said members cooperating on movement of the diaphragm in one direction to restrict and substantially close the air passage and on movement of the diaphragm in the other direction to open said passage fully.

17. A compressed air line drain valve including a housing having an air inlet chamber, an air discharge chamber, a flexible diaphragm separating the two biased for movement in one direction to a normal position on pressure equalization in the chambers and movable in the opposite direction in response to pressure difference in the chambers, means providing an air passage between said chambers and including a pair of interfitting relatively slidable members one of which is movable in opposite directions with and by the diaphragm, said members cooperating on movement of the diaphragm in one direction to choke and substantially close said air passage and on movement of the diaphragm in the opposite direction to open said passage fully, a water outlet from the air inlet chamber, and a valve controlling the water outlet and actuated by the diaphragm movable one of said relatively slidable members.

18. In the structure of claim 9, cooperating stop means on said cylinder and nozzle defining said normal position of the diaphragm and nozzle.

19. In the structure of claim 9, cooperating stop means on said cylinder and nozzle maintaining said stem valve open when the nozzle is in its said normal position.

DEWEY WILKERSON.

REFERENCES CITED

The following references are of record in the file of this patent:

UNITED STATES PATENTS

| Number | Name | Date |
| --- | --- | --- |
| 427,165 | Fickett | May 6, 1890 |
| 621,075 | Haberkorn | Mar. 14, 1899 |
| 2,007,358 | Anger | July 9, 1935 |
| 2,125,144 | Aikman | July 26, 1938 |